United States Patent
Zoeckler et al.

(10) Patent No.: US 7,756,252 B2
(45) Date of Patent: Jul. 13, 2010

(54) METHOD AND SYSTEM FOR NETWORK DENIAL CASE GENERATION

(75) Inventors: Dennis L. Zoeckler, Brighton, MI (US); Bruce A. Groskreutz, Grand Blanc, MI (US); Thomas A. Gault, Troy, MI (US)

(73) Assignee: General Motors LLC, Detroit, MI (US)

( * ) Notice: Subject to any disclaimer, the term of this patent is extended or adjusted under 35 U.S.C. 154(b) by 1136 days.

(21) Appl. No.: 11/396,875

(22) Filed: Apr. 3, 2006

(65) Prior Publication Data

US 2007/0263833 A1 Nov. 15, 2007

(51) Int. Cl.
 *H04M 1/24* (2006.01)
 *H04M 3/08* (2006.01)
 *H04M 3/22* (2006.01)

(52) U.S. Cl. ................. 379/9.04; 379/15.03; 379/126; 379/265.03; 379/265.1; 455/423; 455/569.2

(58) Field of Classification Search ................ 379/1.01, 379/9, 9.02, 9.03, 9.04, 14, 14.01, 10.01, 379/15.01, 15.03, 22, 37, 45, 111, 112.01, 379/112.07, 112.09, 126, 133, 134, 135, 379/140, 265.02, 265.03, 266.1; 455/404.1, 455/414.1, 423, 425, 432.3, 507, 508, 521, 455/552.1, 569.2
See application file for complete search history.

(56) References Cited

U.S. PATENT DOCUMENTS

| | | | |
|---|---|---|---|
| 6,487,496 B2 | 11/2002 | Katayama et al. | |
| 6,493,629 B1* | 12/2002 | Van Bosch | ................. 701/207 |
| 6,871,139 B2 | 3/2005 | Liu et al. | |
| 2003/0087642 A1* | 5/2003 | Mazzara | ..................... 455/450 |
| 2003/0134631 A1* | 7/2003 | Snyder et al. | ............... 455/423 |
| 2003/0211854 A1* | 11/2003 | Mazzara, Jr. | ................ 455/458 |
| 2004/0198366 A1 | 10/2004 | Crocker et al. | |
| 2004/0203439 A1 | 10/2004 | Zerressen | |
| 2005/0083911 A1* | 4/2005 | Grabelsky et al. | ........... 370/352 |
| 2005/0186941 A1 | 8/2005 | Gault et al. | |

* cited by examiner

*Primary Examiner*—Binh K Tieu
(74) *Attorney, Agent, or Firm*—Dierker & Associates, P.C.

(57) ABSTRACT

A method for network denial case generation includes receiving a plurality of third-party carrier call records associated with a plurality of subscriber telematics units at a call center wherein each call record includes a call status, determining at least one call record having a failure condition based on the call status, determining a subscriber telematics unit associated with the call record having the failure condition, and determining a network denial case action for the subscriber telematics unit based on the failure condition. A computer usable medium with suitable computer program code is employed for network denial case generation.

20 Claims, 6 Drawing Sheets

300

600

METHOD AND SYSTEM FOR NETWORK DENIAL CASE GENERATION

FIELD OF THE INVENTION

This invention relates generally to telematics systems. In particular the invention relates to a method and system for network denial case generation.

BACKGROUND OF THE INVENTION

A service provider connects to subscribers using a wireless network. Wireless services on the network are provided by a third-party carrier which administers access denials or permissions to the wireless network. Call failures result from a variety of network conditions that are at times undetected or unrecognized prior to the subscriber reporting a connectivity problem. When the service provider activates a new subscriber, problems with the account setup, equipment problems, or network performance issues are not immediately evident. Subsequent attempts by a subscriber to establish a connection to the service provider are denied where these problems exist.

Call failures include fail to voice (FTV) and no-connect failures. A FTV failure occurs when a call center is unable to establish an authenticated connection to a telematics unit and is described in United States Patent Application Publication number 2005/0186941 to Gault et al, which is incorporated herein by reference and assigned to the assignee of this application. The service provider has knowledge of FTV failures since a connection from the subscriber to the service provider is completed. Conversely, the service provider has a limited ability recognize no-connect failures since these calls fail on the network before a connection is established.

Data for determining the occurrence of an unreported call failure must be obtained from the third-party carrier. Tools for recording logs of network denials are known in the art. Data from the third-party carrier can be combined with data stored by the service provider to identify the subscriber affected.

It is therefore desirable to provide a method and system for providing an automated recall notification that overcomes the limitations, challenges, and obstacles described above.

SUMMARY OF THE INVENTION

One aspect of the invention provides a method for network denial case generation. The method includes receiving a plurality of third-party carrier call records associated with a plurality of subscriber telematics units at a call center wherein each call record includes a call status, determining at least one call record having a failure condition based on the call status, determining a subscriber telematics unit associated with the call record having the failure condition, and determining a network denial case action for the subscriber telematics unit based on the failure condition.

Another aspect of the invention provides a computer readable medium storing a computer program including computer program code for network denial case generation. The medium includes computer program code for receiving a plurality of third-party carrier call records associated with a plurality of subscriber telematics units at a call center wherein each call record includes a call status, computer program code for determining at least one call record having a failure condition based on the call status, computer program code for determining a subscriber telematics unit associated with the call record having the failure condition, and computer program code for determining a network denial case action for the subscriber telematics unit based on the failure condition.

A third aspect of the invention provides a system for network denial case generation. The system includes means for receiving a plurality of third-party carrier call records associated with a plurality of subscriber telematics units at a call center wherein each call record includes a call status, means for determining at least one call record having a failure condition based on the call status, means for determining a subscriber telematics unit associated with the call record having the failure condition, and means for determining a network denial case action for the subscriber telematics unit based on the failure condition.

The aforementioned and other features and advantages of the invention will become further apparent from the following detailed description of the presently preferred example, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EXAMPLES

A service provider that relies on wireless communications to connect with a subscriber can have connectivity issues related to the wireless carrier system. In one example, a service provider relies on a third-party wireless system for communicating with the subscriber. A query to a third-party network database allows identification of wireless calls that were denied service. Regular queries are used to pull call records for analysis. Through the use of a sequence of data transformations an affected subscriber telematics unit and a defect basis for the denial of service is identified and a network denial case is generated. The network denial case contains subscriber information, call completion indicators, and the defect basis. The network denial case can then be assigned to a technical assistance team for further analysis and intervention based on the defect basis.

Figure 1:
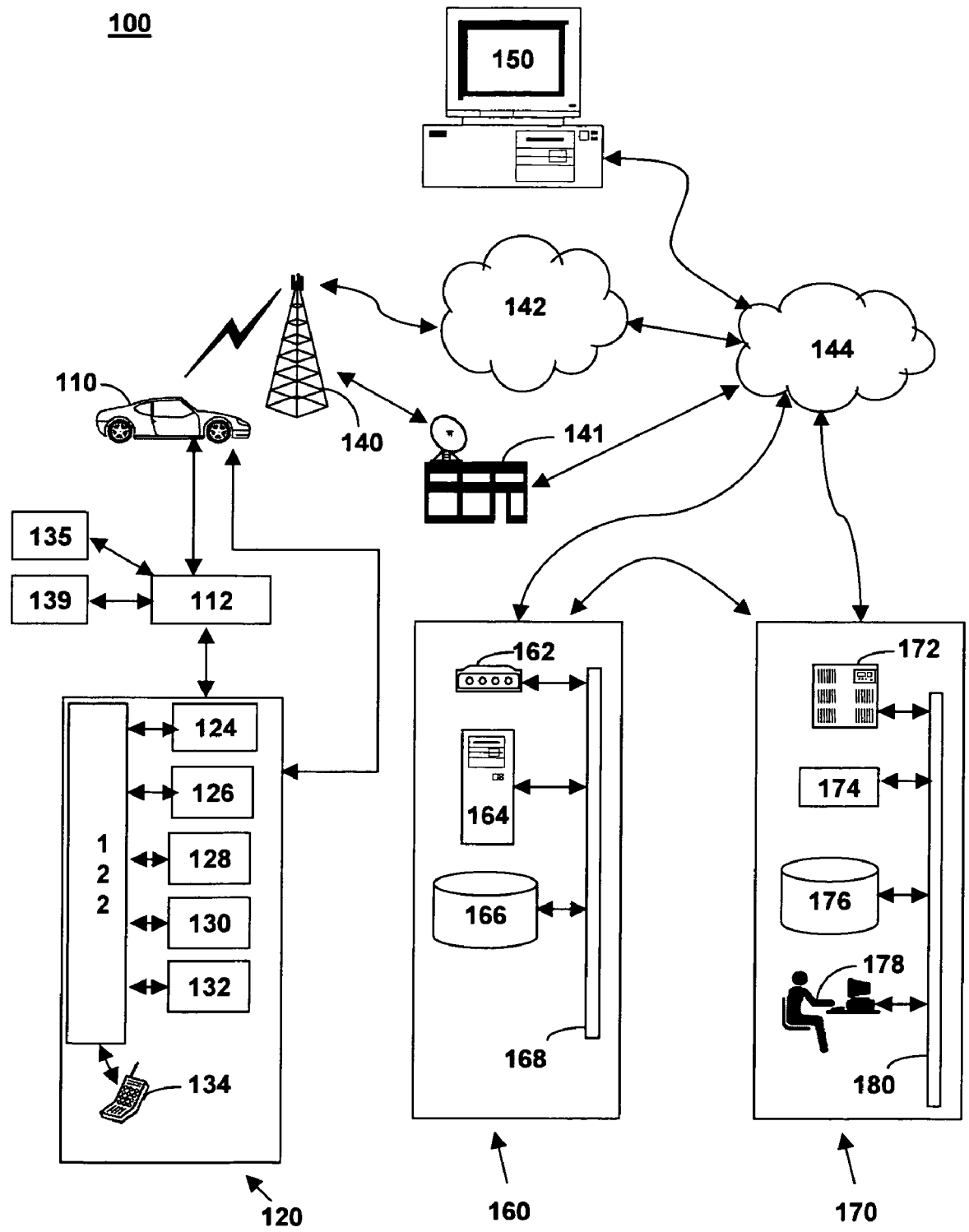
FIG. 1 illustrates a schematic of one example of a system for providing network denial case generation, in accordance with the invention.

FIG. 1 illustrates a schematic of one example of a system for providing network denial case generation, in accordance with the invention at 100. The network denial case generation system includes a mobile vehicle communication unit (MVCU) 110, a mobile vehicle communication network 112, one or more embedded modules 139, a communication device such as a telematics unit 120, one or more wireless carrier systems 140, one or more communication networks 142, one or more land networks 144, one or more client, personal, or user computers 150, one or more web-hosting portals 160, and one or more call centers 170. In one example, MVCU 110 is implemented as a mobile vehicle equipped with suitable hardware and software for transmitting and receiving voice and data communications. In one example, a display 135 such as a dialed digital display in a radio unit or in an instrument panel is embedded in MVCU 110. In other examples, automated recall notification system 100 includes additional components not relevant to the present discussion. Mobile vehicle communication systems and telematics units are known in the art.

Embedded modules 139 are any electronic module configured to enable or assist in the operation of MVCU 110, or any of its included systems. For example, one embedded module performs odometer functions, while another embedded module controls HVAC operations within the mobile vehicle. In another example, an embedded module senses a mobile vehicle operation input, such as an ignition cycle, and sends a signal via vehicle communication network 112 that is received by telematics unit 120. Any number of embedded modules 139 can be included.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a mobile vehicle communication network 112, sends signals to various units of equipment and systems within mobile vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, mobile vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one example, mobile vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

In one example, telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other examples, telematics unit 120 is implemented without one or more of the above listed components such as, for example, GPS unit 126 or speakers 132 or includes additional components not relevant to the present discussion.

In various examples, processor 122 is implemented as a digital signal processor (DSP), microcontroller, microprocessor, controller, host processor, or vehicle communications processor. In an example, processor 122 is implemented as an application-specific integrated circuit (ASIC). In another example, processor 122 is implemented as a processor working in conjunction with a central processing unit (CPU) performing the function of a general purpose processor. GPS unit 126 provides longitude and latitude coordinates of the mobile vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144. Wireless carrier system 140 is managed by a third-party carrier 141. Third-party carrier 141 maintains call records for all calls service by wireless carrier system 140.

Land network 144 connects communication network 142 to client computer 150, web-hosting portal 160, and call center 170. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one example, modem 162 resides inside web server 164. Land network 144 transmits data communications between web-hosting portal 160 and call center 170.

Web server 164 receives user-preference data from user computer 150 via land network 144. In alternative examples, computer 150 includes a wireless modem to send data to web-hosting portal 160 through a wireless communication network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. In one example, web server 164 includes computer applications and files for managing and storing personalization settings supplied by the client and subscriber status supplied by telematics unit 120. For each subscriber, the web server potentially stores hundreds of preferences for wireless vehicle communication, networking, maintenance and diagnostic services for a mobile vehicle.

In one example, one or more web servers 164 are networked via network system 168 to distribute data among its network components such as database 166. In an example, database 166 is a part of or a separate computer from web server 164. Web server 164 sends data transmissions with status information to call center 170 through land network 144.

Call center 170 is a location where many calls are received and serviced at the same time, or where many calls are sent at the same time. In one example, the call center is a test center facilitating communications to mobile vehicle 110 for testing of embedded modules 139. In another example, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other examples, call center 170 and web-hosting portal 160 are located in the same or in different facilities.

In one example, call center 170 receives call records corresponding to call connection status, including FTV (Fail To Voice) and failure to connect, or no-connection failure records between the call center 170 and telematics unit 120. Calls between the telematics unit 120 and call center 170 may, for example, be initiated by a trigger resident within the telematics unit 120. A trigger is a monitor that takes action responsive to an event. A trigger, for example, may be an vehicle 110 ignition cycle. An ignition cycle trigger may, for example, initiate a call from the telematics unit 120 to the call center 170 unbeknownst to the subscriber. A call record is established for the call, and call connection status information comprised of FTV, failure to connect and/or no-connect failure records is collected. Triggers may be event driven, such as, for example, a vehicle 110 ignition cycle or may be periodic, comprised of, for example, a software timer or counter within the telematics unit 120. Call center 170 generates network denial cases based on the received call records and subscriber data-stored at the call center.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives requests for a variety of services from the client via computer 150, web-hosting portal 160, and land network 144 and awareness messages from telematics unit 120. Communication services manager 174 transmits requests for subscriber status and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one example, communication services advisor 178 is implemented as a real advisor. In an example, a real advisor is a human being in verbal communication with a user or subscriber (e.g., a client) in MVCU 110 via telematics unit 120. In another example, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, recall notifications navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative example, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

Figure 2:
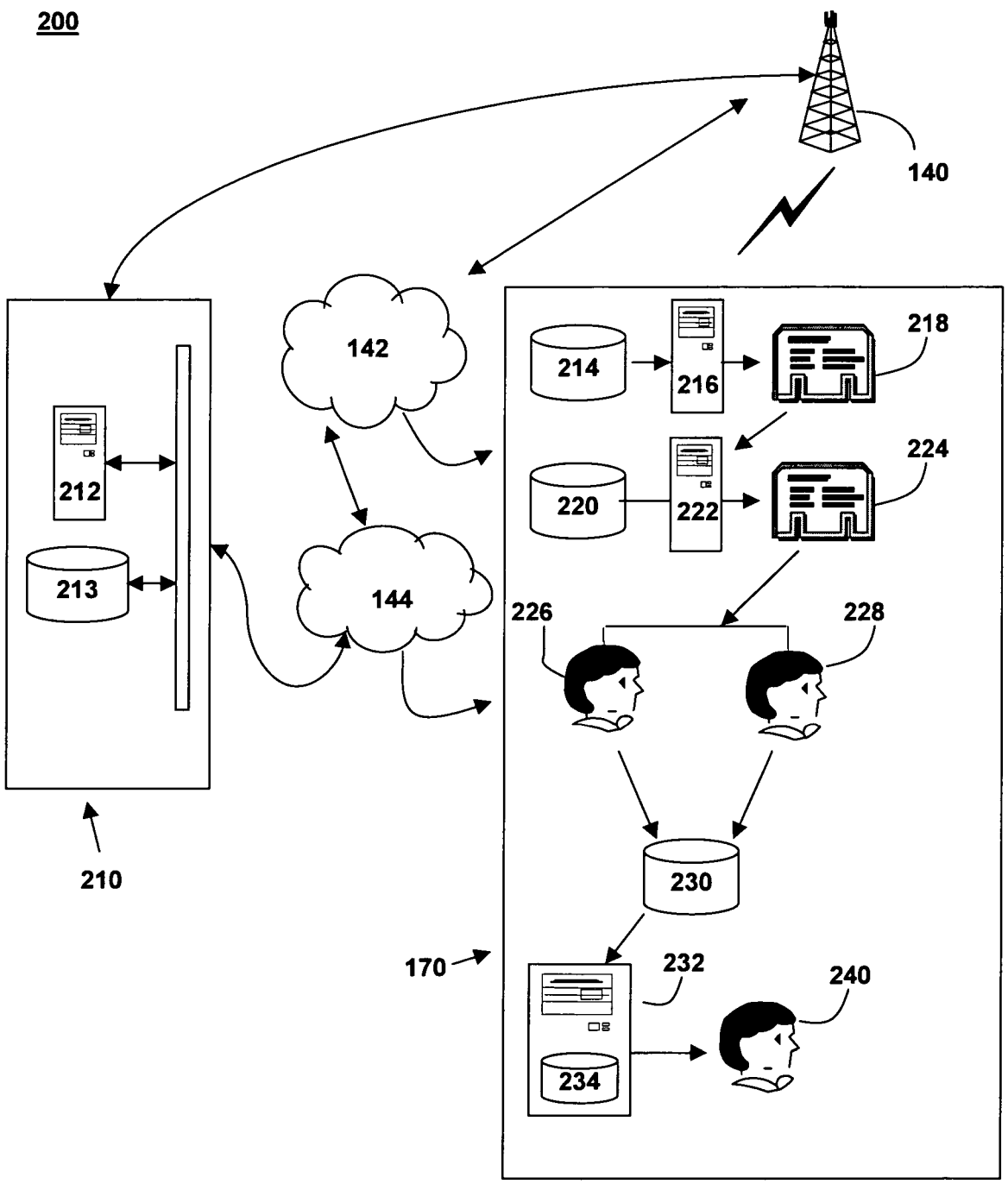
FIG. 2 illustrates a schematic representative of one example of a system for network denial case generation, in accordance with the invention.

FIG. 2 illustrates a schematic 200 representative of one example of a system for network denial case generation, in accordance with the invention.

The network denial case generation system includes a third-party carrier location 210 providing network services to wireless carrier system 140. Third-party carrier location 210 includes a network server 212 and a network database 213 storing call records corresponding to each call serviced by wireless carrier system 140. In one example, network server 212 includes an application for managing call records. Call records include data reflecting each call connection and connection attempt received by the network. Each call record includes at least one outpulsed call center toll free number.

A communications services database, such as a toll-free number (TFN) database 214, at call center 170 stores call records requested from network database 213. Call records are transmitted over wireless carrier system 140, communication network 142, or land network 144. Call center 170 includes an application server 216 storing an FTV/no-connect application for isolating call records based on the call status and producing a FTV/no-connect report 218. In one example, application server 216 also stores computer program code for converting a HEX electronic serial number (ESN), from the call record, to a decimal ESN.

In one example, account tables are stored in an account database 220 on account server 222 at call center 170. Account tables include information regarding subscriber telematics units and related subscriber's. The account tables are maintained by the service provider. The information includes data relating to the service status, either active or non-active, of each subscriber telematics unit. Data from the account tables and the FTV/no-connect report are compared to produce an active/non-active report 224 identifying an active vehicle/telematics unit associated with an active subscriber 226 and a non-active vehicle/telematics unit associated with a non-active subscriber 228. The data from the active/non-active report corresponding to each active subscriber is written to a primary FTV/no-connect database 230. In one example, data from the active/non-active report corresponding to each non-active subscriber is also written to primary FTV/no-connect database 230. The records from the primary FTV/no-connect database are copied to a technical support server 232 containing a network denial case database 234 wherein each record constitutes a network denial case. A technical support team 240 maintains the network denial case database. The network denial cases are prioritized and determined for intervention by the technical support team.

Figure 3:
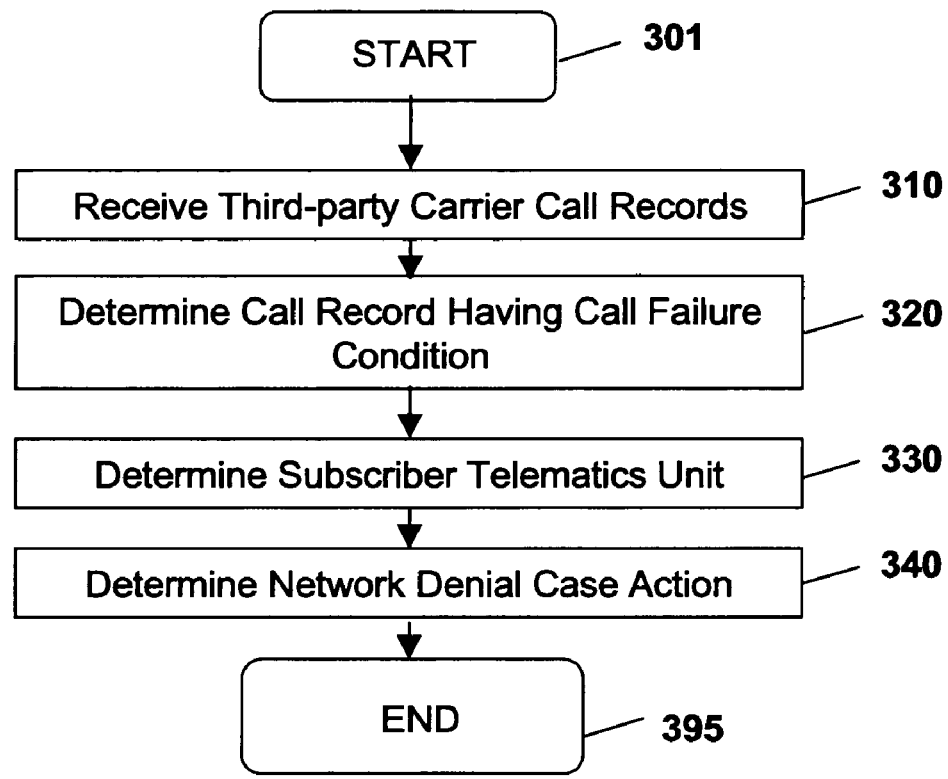
FIG. 3 illustrates a flowchart representative of one example of a method for network denial case generation, in accordance with the invention

FIG. 3 illustrates a flowchart 300 representative of one example of a method for network denial case generation, in accordance with the invention. The network denial case links data from third-party carrier location 210 with subscriber data from call center 170. The data from the third-party carrier includes the call records corresponding to each call serviced by wireless carrier system 140. The method begins at 301.

Call records are received at the call center from the third-party carrier (block 310). The call records are received as a result of regular queries made to the network database. The third-party carrier provides wireless network services through wireless carrier system 140. Method 300 determines which call records include an outpulsed call center toll-free number (TFN), and store such records in a TFN table. A call status that identifies whether the call was completed successfully, denied for service, or cancelled is assigned to each call record in the TFN table.

A call record having a failure condition is determined based on the call status (block 320). The failure condition is a situation where a call connection has failed and consequentially the call was not completed between the call center and the subscriber. A failure condition is also referred to as a FTV/non-connect failure.

The subscriber telematics unit associated with the call record having the failure condition is determined (block 330). In order to identify the subscriber telematics unit for which the call connection failed, a sequence of data manipulations is performed to associate the call records obtained from the third-party carrier with subscriber data from the call center.

A network denial case action is determined for the subscriber telematics unit based on the failure condition (block 340). The network denial case action is a response to a particular call record having a failure condition and includes contacting the subscriber, connecting to the telematics unit, or contacting the third-party carrier.

Figure 4:
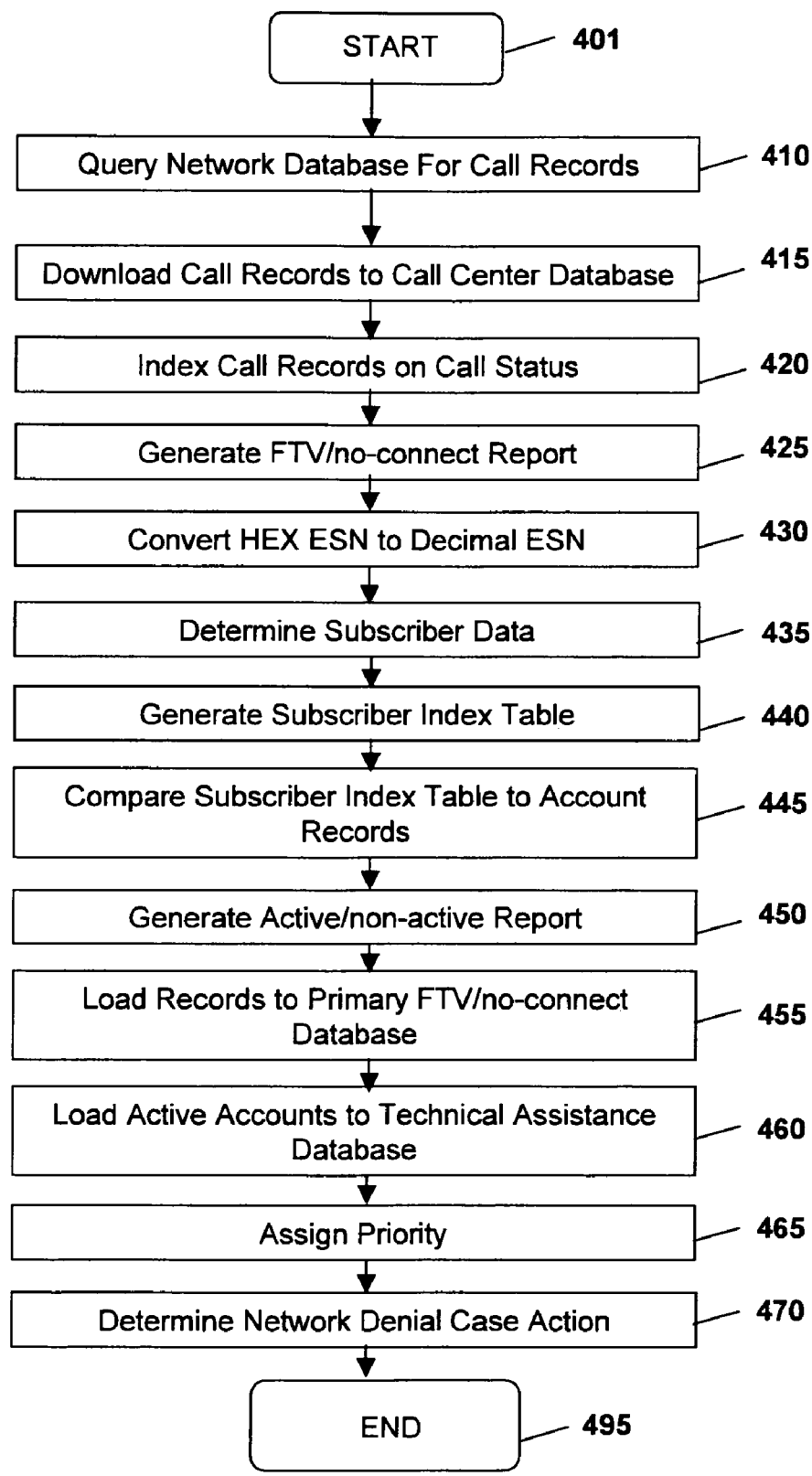
FIG. 4 illustrates a flowchart representative of one example of a method for network denial case generation, in accordance with the invention

FIG. 4 illustrates a flowchart 400 representative of one example of a method for network denial case generation, in accordance with the invention. The method begins at 401.

Call records containing call center toll-free numbers (TFN) outpulsed by the wireless carrier system are pulled from the network database maintained by the third-party carrier (block 410). In one example, a batch query is performed against the network database at regular intervals and the results of the batch query are downloaded to the call center TFN database (block 415) at the call center. The call center TFN database includes, for example, the fields listed in table 1.

TABLE 1

| | Call Center TFN database fields |
|---|---|
| 1 | Mobile identification number (MDN) |
| 2 | Electronic Serial Number (HEX ESN) |
| 3 | Call date |
| 4 | Call time |
| 5 | Serving switch name |
| 6 | Treatment code (TC) |
| 7 | Call class indicator (CCI) |
| 8 | Outpulsed number (TFN) |

In one example, the TC and CCI fields, which are assigned in the call record by the third-party carrier, constitute the call status. A determination whether a call was completed successfully, denied by the serving switch or cancelled by the wireless carrier system can be made based on the call status. Calls denied by the serving switch result from configuration issues on the wireless carrier system. Calls cancelled by the network result from wireless carrier system performance issues.

The call records in the call center TFN database are indexed on the call status including the TC and CCI fields (block 420). The indexing segregates the records according to successful and no-connect call treatment.

Through the application of call treatment sequence logic to the indexed call records, a report (e.g. a FTV/no-connect report) is generated that includes the call records having failed and no-connect call status (block 425).

The HEX ESN field of each record in the FTV/no-connect report is converted from a hexadecimal format to a decimal number (block 430). The decimal ESN is used by the call center to determine a subscriber data for the call records with no-connect call status (block 435). In one example, the subscriber data is contained in a vehicle/unit/subscriber/account decision support system table. In one example, the decimal ESN is linked to the vehicle/unit/subscriber/account decision support system to extract the subscriber data listed in table 2.

TABLE 2

Subscriber Data

| | |
|---|---|
| 1 | Vehicle status |
| 2 | Subscriber status |
| 3 | Account status |
| 4 | Subscriber STID |
| 5 | Subscriber MDN |
| 6 | Subscriber MIN |
| 7 | Subscriber ESN |
| 8 | Subscriber GEN ID |

The subscriber data is combined with the FTV/no-connect report data into a single subscriber index table (block 440). In one example, the index table includes the fields listed in Table 3.

TABLE 3

Subscriber Index table

| | |
|---|---|
| 1 | Treatment Code |
| 2 | Call Class Indicator |
| 3 | Vehicle status |
| 4 | Subscriber status |
| 5 | Account status |
| 6 | Subscriber STID |
| 7 | Subscriber MDN |
| 8 | Subscriber MIN |
| 9 | Subscriber ESN |
| 10 | Subscriber GEN ID |
| 11 | Serving Switch |
| 12 | Call Class Message |

The subscriber index table is compared, based on the ESN field, to account tables (block 445) from the account database. The comparison results in a determination of active and non-active subscriber telematics units and a subscriber associated with each of those telematics units. An active/non-active report is generated based on the determination (block 450). In one example, the account tables are vehicle/unit/account tables stored in a call center subscriber account database.

The active and non-active account records from the active/non-active report are loaded into a primary FTV/no-connect database (block 455).

The active subscribers are isolated from the primary FTV/no-connect database and written to a technical assistance database (block 460). Each record in the technical assistance database defines a network denial case. In one example, the network denial case is assigned to a technical assistance team. A priority is assigned to each network denial case based on the call status including the TC and CCI (block 465). A network denial case action is then determined for each network denial case (block 470). The method terminates (block 495).

Figure 5:
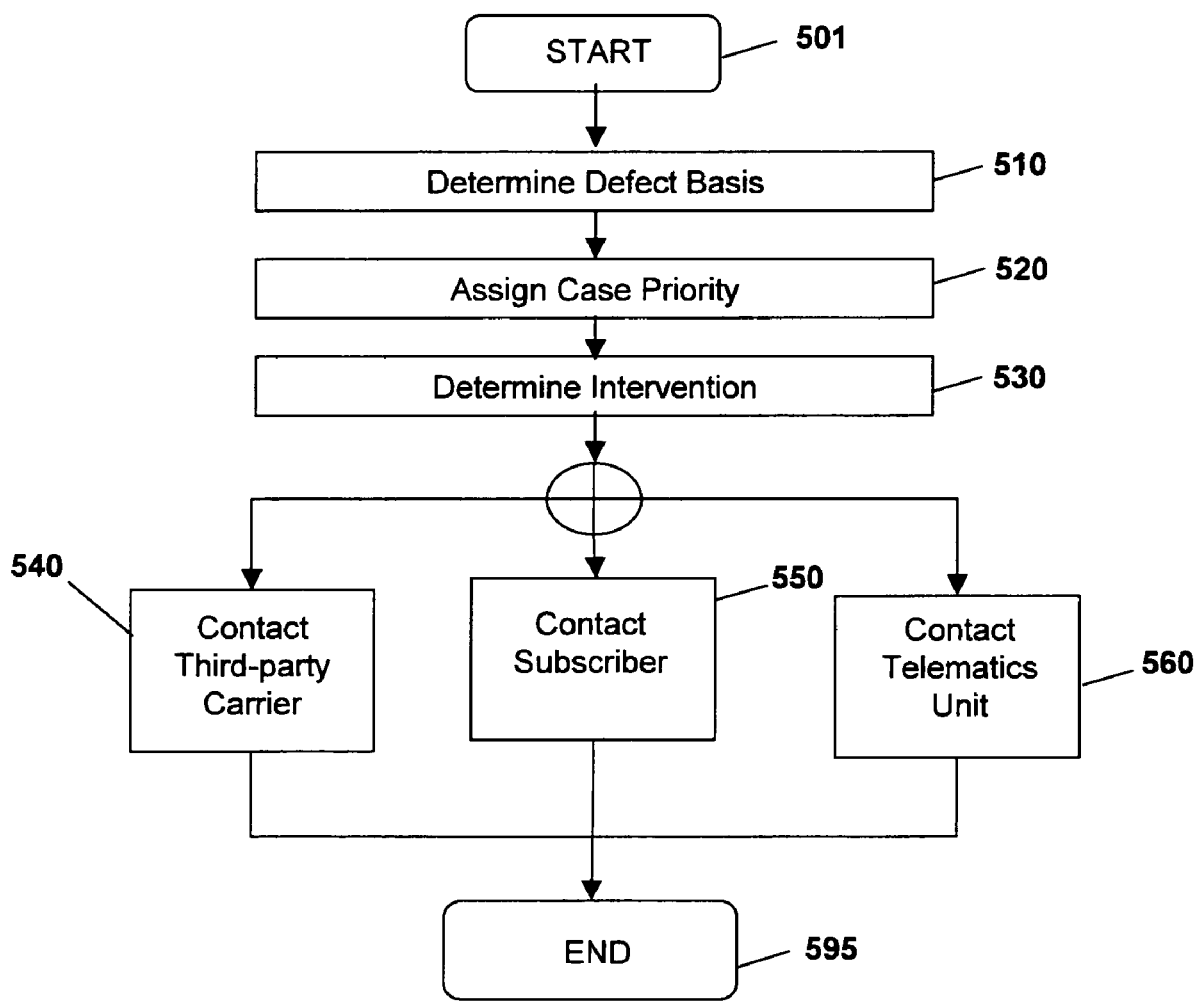
FIG. 5 illustrates a flowchart representative of one example of a method for determining a network denial case action, in accordance with the invention.

FIG. 5 illustrates a flowchart 500 representative of one example of a method for determining a network denial case action at block 470 of FIG. 4, in accordance with the invention. The method begins at 501.

A defect basis is determined for each network denial case in the primary FTV/no-connect database based on the call status (block 510). A defect basis is the cause of a network denial. The TC and CCI from the call status determine a defect basis, such as an invalid ESN, a failed authentication, a roaming service denial, and a MDN that is not registered with a cellular provider.

A case priority is assigned for each network denial case (block 520). In one example, the case priority identifies network denial cases having the same defect basis and identifies network denial cases involving the same subscriber telematics unit. The case priority also guides ordering the network denial cases for intervention. Cases indicating a subscriber is experiencing a persistent failure condition can be prioritized over cases involving a single instance of a failure condition.

Based on the defect basis, an intervention is determined for each network denial case (block 530). The defect basis and the case priority are used in determining the intervention that the technical assistance team will use to further diagnose and repair the cause of the failure condition. The intervention involves contacting the third-party carrier (block 540), contacting the subscriber (block 550), or contacting the telematics unit using a data connection (block 560).

In one example, the defect basis is a call connection denied as a result of a failed authentication of the MDN and the ESN. The intervention by the call center for this network denial case includes informing the third-party carrier that a MDN, an ESN, or both should be determined for the subscriber and loaded on the network.

In another example, the defect basis is a MDN, a MIN, or an ESN transmitted from the telematics unit that differs from what is stored in a third-party billing application, home location registry (HLR), or both. The intervention by the call center for this network denial case includes informing the third-party carrier of the need to verify the MDN, MIN, and ESN entries for the subscriber in the billing application and the HLR, or to perform an ESN change to a communications chipset within the subscriber's mobile vehicle.

In one example, a telematics unit may have an analog MDN when attempting to connect to a PCS network. The intervention by the call center for this network denial case includes requesting an update to the MDN by the third-party carrier or suggesting an equipment upgrade for the subscriber.

In a further example, the telematics unit has an improper preferred roaming list (PRL) that causes the telematics unit to be denied service when roaming on the wireless carrier system. This network denial case indicates an intervention wherein the call center requests the third-party carrier to update the PRL for the telematics unit.

In an example where the defect basis is an equipment problem within the mobile vehicle, the intervention involves contacting the telematics unit using a data connection to verify the functionality of the telematics unit or of related equipment in the mobile vehicle. If the data connection is not possible, the call center can contact the subscriber and provide instructions to the subscriber where the vehicle should be taken for diagnosis and repair of the equipment failure.

The call record, in one example, discloses that the network canceled the call. This defect basis suggests a network performance issue. The intervention includes the call center contacting the third-party carrier with information that can help identify and locate the cause of the network performance issue. The information includes data such as the time the failure occurred, the location of the telematics unit when the failure occurred, and the serving switch that attempted to service the call.

In others examples, the network denial case contains a defect basis wherein a subscriber's account that is incorrectly marked as non-active or inaccurate subscriber information that is stored at the call center. In these cases, the intervention involves the call center contacting the subscriber to verify account information and loading the correct subscriber information at the call center. The method terminates (block 595).

Figure 6:
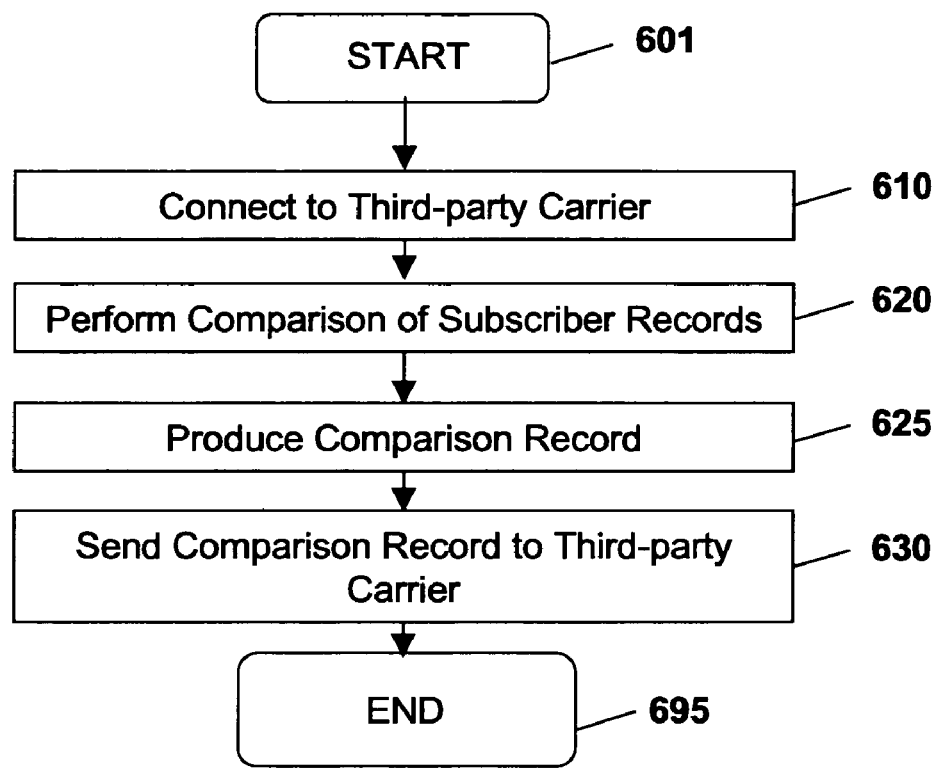
FIG. 6 illustrates a flowchart representative of one example of a method for contacting the third party carrier, in accordance with the invention.

FIG. 6 illustrates a flowchart 600 representative of one example of a method for contacting the third party carrier at block 540 of FIG. 5, in accordance with the invention. The method begins at 601.

The call center 170 connects to the third-party carrier (block 610). Examples of connections include a voice connection, a data connection, or a combination of the two.

Once the connection is established a comparison of subscriber records from the call center to subscriber records from the third-party carrier can be performed to determine if proper data is loaded in the wireless carrier system (block 620). In one example, the third party carrier performs the comparison. In another example, the call center performs the comparison. The call center either downloads the records for comparison or has the necessary permissions to the network database for performing the comparison. In another example, an automated procedure performs the comparison based on parameters input by the call center or third-party carrier. A comparison record is produced based on the comparison (block 625).

The comparison record is sent to the call center and the third-party carrier (block 630). In one example, if a failure condition is present the comparison record is sent to the third-party carrier.

The comparison record allows the technical assistance team and the third-party carrier to identify subscribers having FTV/no-connect failure conditions requiring further intervention. If the comparison reveals a mismatch between the records, the third-party carrier or the call center can correct the mismatch. The method terminates (block 695).

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for network denial case generation, the method comprising:
   receiving a plurality of third-party carrier call records associated with a plurality of subscriber telematics units at a call center wherein each call record includes a call status;
   determining at least one call record having a failure condition based on the call status;
   determining a subscriber telematics unit associated with the call record having the failure condition; and
   determining a network denial case action for the subscriber telematics unit based on the failure condition.

2. The method of claim 1 further comprising:
   querying a network database for the plurality of third-party carrier call records wherein the third-party carrier call records correspond to a call center number.
   downloading the third-party carrier call records to a call center database.

3. The method of claim 1 wherein the call records are received at substantially regular intervals.

4. The method of claim 1 wherein the call status includes a treatment code and a call class indicator.

5. The method of claim 1 wherein determining the subscriber telematics unit further comprises
   comparing a subscriber index table to a plurality of account records based on an electronic serial number.

6. The method of claim 1 further comprising:
   determining an account status for a subscriber telematics unit wherein the account status includes active and non-active statuses.

7. The method of claim 1 further comprising:
   determining a subscriber data associated with the call record.

8. The method of claim 7 further comprising:
   generating a subscriber index table wherein the subscriber index table includes the subscriber data and the call record.

9. The method of claim 1 wherein the network denial case is stored in a technical assistance database and includes the call record having a failure condition, a subscriber data, an account status, and a defect basis.

10. The method of claim 1 further comprising determining a network denial case priority for the network denial case based on the call status.

11. The method of claim 1 wherein determining the network denial case action comprises
    determining a defect basis for the failure condition;
    assigning a case priority based on the defect basis; and
    determining an intervention based on the case priority and the defect basis.

12. The method of claim 1 wherein the network denial case action includes contacting the third-party carrier.

13. The method of claim 1 wherein the network denial case action includes contacting a subscriber.

14. The method of claim 1 wherein the network denial case action includes contacting the subscriber telematics unit using a data connection.

15. The method of claim 1 further comprising:
    comparing the subscriber data at the call center with a corresponding subscriber record from the third-party carrier;
    producing a comparison record based on the comparison; and
    sending the comparison record to the third-party carrier.

16. A computer usable medium storing a computer program including computer program code for network denial case generation, the computer usable medium comprising:
    computer program code for receiving a plurality of third-party carrier call records associated with a plurality of subscriber telematics units at a call center wherein each call record includes a call status;
    computer program code for determining at least one call record having a failure condition based on the call status;
    computer program code for determining a subscriber telematics unit associated with the call record having the failure condition; and
    computer program code for determining a network denial case action for the subscriber telematics unit based on the failure condition.

17. The computer usable medium of claim 16 further comprising:
    computer program code for querying a network database for the plurality of third-party carrier call records wherein the third-party carrier call records correspond to a call center number.
    computer program code for downloading the third-party carrier call records to a call center database.

18. The computer usable medium of claim 16 wherein computer program code for determining the subscriber telematics unit further comprises:
    computer program code for comparing a subscriber index table to a plurality of account records based on an electronic serial number.

19. The computer usable medium of claim 16 wherein computer program code for determining the network denial case action further comprises:
    computer program code for determining a defect basis for the failure condition;
    computer program code for assigning a case priority based on the defect basis; and computer program code for determining an intervention based on the case priority and the defect basis.

20. A system for network denial case generation comprising:
- means for receiving a plurality of third-party carrier call records associated with a plurality of subscriber telematics units at a call center wherein each call record includes a call status;
- means for determining at least one call record having a failure condition based on the call status;
- means for determining a subscriber telematics unit associated with the call record having the failure condition; and
- means for determining a network denial case action for the subscriber telematics unit based on the failure condition.

* * * * *